Patented July 22, 1930

1,771,342

UNITED STATES PATENT OFFICE

ELMER V. McCOLLUM AND OLAF S. RASK, OF BALTIMORE, MARYLAND

SOLID FORM OF LACTIC ACID USEFUL IN BAKING POWDERS AND SELF-RISING FLOURS AND MODE OF PREPARING SAME

No Drawing.   Application filed January 7, 1929.   Serial No. 330,962.

In our copending applications Numbers 277,095 filed May 11, 1928, and 321,268 filed November 22, 1928, we have described and claimed certain products and processes for their manufacture. The products are essentially lactic acid occluded in or absorbed by gelatinized starch or by gelatinized partly dextrinized starch. As a result of further research we have developed certain improvements in the above processes and products. In the last mentioned case, we have described drying the mixture of gelatinized starch and lactic acid in water, while spread out in thin sheets, say for example by placing the pasty mixture in trays in a vacuum shelf oven or by the use of a vacuum rotating internally heated drum dryer in which the pasty liquid is fed to the surface of an internally heated drum rotating in a vacuum housing, the dried product being scraped off from the surface of the rotating drum when sufficiently dried. In the latter application the heat could be carried up to 125° C., giving a slight brownish color. The present improvements consists essentially and mainly of employing temperatures higher than 125° C., which is the highest temperature mentioned in our said prior applications. In our present processes we employ temperatures so high as not only to dry the product more rapidly but also to cause the product so dried to undergo greater chemical changes or chemical modifications which we have found to be improvements in the finished product. These higher temperatures may range from 125° C. to about 137° C. or so. The high limit is obviously somewhat indefinite. The figure specified, viz. 137° C. is only intended to indicate approximately the high limit which will probably vary both above and below this figure due to other conditions such as the variety of starch used and character desired in the finished product. The material should however, not be heated to above 140° C., at which point injury would occur.

The high limit will be any temperature at which the lactic acid begins to volatilize too rapidly and any temperature which causes the starch paste (used) in contact with lactic acid to undergo an undesirably rapid or an undesirably extensive dextrinization or other chemical changes.

A preferred example of the improved process for manufacturing the improved solid form of lactic acid in starch or dextrinized starch is as follows:

Gelatinize the starch with 4 to 8 parts of water. Smaller quantities of water should be used for thin boiling starches or partly dextrinized starches. Mix or stir into the resulting starch paste the desired amount of lactic acid. An amount of commercial lactic acid containing a quantity of the actual lactic acid equal to the amount of starch or somewhat less, may be used. It is inadvisable to use much more lactic acid than the amount of starch present in the paste, since in the subsequent drying and heating process the proportion of lactic acid volatilized seems to increase with an increased initial proportion of lactic acid to starch in the undried paste. Furthermore it becomes increasingly difficult to prepare dry, hard and brittle products which will grind readily, containing more than about 45 to 48% of lactic acid. The resulting starch paste containing lactic acid may then be dried in any suitable vacuum drying apparatus equipped to properly distribute a source of heat capable of producing a temperature of 125° to 140° C. or so in the drying chamber. The degree of vacuum may vary. Ordinarily 30 to 60 mm. (absolute pressure) will be found to give good results, but we do not restrict the invention thereto. If desired, it is permissible to release the vacuum when practically all of the water has been driven off and then carry out the browning or dextrinization at atmospheric pressure. The advantage of so doing is that less lactic acid is volatilized.

It is easy to prepare products containing well over 30% lactic acid, by this process. Products containing over 40% of lactic acid can readily be made, although such products could not be made by the use of ungelatinized starch. By careful operation products containing over 45% lactic acid can be made by this process. We prefer to produce products, by this process, containing over 46%, say up to about 48% of actual lactic acid, such products being very suitable for use in making high grade baking powder.

We prefer to make up the baking powder to contain, when fresh, 13% (or slightly more) of available $CO_2$ which will be released on prolonged contact with water, the baking powders made by this process being rather slow in their action, which is a great advantage, since far less of the $CO_2$ is lost during the mixing of the dough or batter.

If desired we may mix some gelatin with the starch to be used, this being added, for example, to the dry raw starch, to be gelatinized. This may have some effect in making the dried lactic-acid-in-starch preparation less hygroscopic, and in making the baking powder slower in its action.

In the claims of this application we use the term "starchy material" to include raw starch, partly dextrinized starch, flour, mixtures containing starch and gelatin, or broadly stated, edible substances whether occurring alone or in admixtures, containing starch as their principal component.

We prefer to regulate the speed of reaction (liberation of $CO_2$ in the baking powder) by regulating the size of granulation of the dried product. A "slow" baking powder is produced by grinding the dried product (which is vitreous in appearance) to about the fineness of wheat flour, and as much slower, or "extremely slow" baking powder is produced if the dried product is ground to about the fineness of corn meal.

Among the apparatus suitable for the drying process may be mentioned the following: Steam jacketed vacuum pans or kettles preferably equipped with mechanical agitators; vacuum shelf driers and vacuum driers containing a rotating internally heated drum, upon the outside of which drum the liquid or soft pasty mass is dried. We prefer this latter. In using the steam jacketed vacuum pan or kettle it is desirable to stir the material more or less continually during the drying. In using the vacuum shelf drier the material should be contained in acid resistant trays in layers ordinarily less than ½ inch thick, these trays to be placed on the shelves in the drier. In using the vacuum rotating drum drier the material is applied to the surface of the rotating drum in the form of a film or a very thin layer. In this latter type of apparatus, the drum usually just dips into a trough carrying the liquid or semi-liquid material to be dried, and a spreader limits the thickness of the film carried. A scraper removes the dried film from the drum.

The drying operation and heat treatment may be considered complete when the dried product has acquired a distinctly yellow or yellowish brown color. This color is obviously due to certain chemical changes in the starch, probably of the nature of a dextrinizing. If the heat treatment has not been carried too far, the above color will not show after the product has been ground. The ground and more especially the pulverized product may look practically white, even though it may have been distinctly brownish when coming from the dryer and previous to grinding. Mixed with white sodium bicarbonate and dry starch (for making baking powder) it will look like a pure white powder, but even if not absodutely white, it will still be white enough for use as baking powder.

The following are some of the advantages of the described improved process of drying at higher temperatures:—

1. It is more rapid, that is, it requires or consumes less time.
2. It affords a greater assurance of a complete removal of moisture.
3. It results in a more desirable product.

The following are some of the improvements in the solid form of lactic acid prepared by the above process.

1. It grinds or pulverizes more easily and does not clog the grinding machinery as readily as do products dried at lower temperatures.
2. When brought in contact with water, the lactic acid dissolves or diffuses out of the starchy material more rapidly. It will therefore react more rapidly with soda and at what appears to be a more nearly optimal rate for baking powders and self-rising flours.
3. When mixed with soda it makes into baking powder of better keeping quality and a more granular and less soggy consistency.
4. The product is less hygroscopic (i. e. more completely non-hygroscopic).

For making baking powders or self-rising flour, the dried lactic-acid-in-starch preparation can be ground to about the fineness of flour, or where a very slow acting baking powder is desired, the same can be ground to a coarser condition, say as coarse as ordinary corn meal if desired, it being understood that the coarser the product, the more stable will be the baking powder during storage, and the slower will be the action of the baking powder when used in making the dough.

The following is given as a typical formula for a baking powder containing 14% of $CO_2$ (total) to be released or displaced exclusively by lactic acid.

| | |
|---|---|
| $NaHCO_3$ | 26.8 |
| Lactic acid | 28.71 |
| Starch (filler) | 44.49 |
| | 100.00 |

Such a baking powder has heretofore been an impossibility due to the liquid nature of lactic acid. However, the above described solid lactic-acid-in-starch preparation makes possible a powder equivalent to that indicated by the above formula. If, for instance, we have a solid lactic acid and starch preparation which contains 41.0% lactic acid, available under baking conditions, then the above powder would be prepared according to the following formula:

NaHCO$_3$ _____ 26.8
Solid lactic-acid-in-starch preparation (41% lactic acid)_____ 70.1
Inert filler (starch, flour, or similar material _____ 3.1
                                                                    ─────
                                                                    100.0

By omitting the extra filler a powder could be obtained capable of liberating a slightly higher amount of $CO_2$.

Certain other acidulous materials commonly used in the baking powder art (one or several) may be occluded in gelatinized starch, in the manner above referred to. In some cases it is advisable to use a part of the acid material as lactic acid in the occluded condition, and to use another part of the acidulous material, say cream of tartar or monocalcium phosphate in the ordinary powdered condition. Additional amounts of filler, such as starch may be used if desired.

A self-raising flour may be prepared by incorporating into flour the desired amounts of NaHCO$_3$, and the solid lactic acid starch preparation in stoichiometric proportions.

It is furthermore understood that this invention includes baking powders and self-rising flours in which the above solid lactic acid starch preparation is used in conjunction with other acids or acid-reacting constituents which may be or may not have been treated with gelatinized starch in the manner indicated in the case of lactic acid. In this way we can readily adjust to a certain extent the proportion of the total amount of gas which will be given off during the mixing of the dough, to the proportion which will be given off during the subsequent working up (kneading, etc.) and baking of the food material.

We have above referred to the use of water for gelatinizing the starch. Other aqueous liquids could be used which are non-injurious for the purpose for which the product is to be used.

In the appended claims we employ the term "starch" to cover this substance from any source whether used in the pure form alone, or in the form of flour, or in admixture with gelatin, as above described.

In referring to the product, in this application we use the term "lactic acid" to denote lactic acid itself, and any mixture of lactic acid itself and such of its anhydrides as may result in the above described process.

This application includes baking powders and self-rising flours containing the above solid form of lactic acid with or without other acid constituents.

We claim:—
1. A yellowish brown starchy product having a vitreous form, containing lactic acid, the starch therein being gelatinized.
2. A yellowish brown vitreous partly dextrinized gelatinized starch containing lactic acid, the amount of lactic acid being a major fraction of the amount of starch.
3. A baking powder containing as an acid constituent, the product as covered in claim 2.
4. A solid material adapted to react with a carbonate salt in the presence of water to produce $CO_2$, such material being in a comminuted state and being substantially anhydrous, such material containing lactic acid occluded in dried gelatinized starchy material.
5. A process which comprises gelatinizing starch in aqueous liquid, mixing lactic acid with the same, and drying in a vacuum at a temperature too low to effect any considerable blackening of the starch.
6. A solid product comprising dried gelatinized starchy material having at least several per cent of lactic acid occluded therein, such product being sufficiently water-free to be capable of use as the acid constituent of a baking powder.
7. A new product of manufacture, the same being a substantially dry solid preparation of lactic acid, composed essentially of gelatinized starch and at least several per cent of lactic acid, together with a small amount of gelatin.
8. In the production of a solid substantially dry preparation consisting essentially of starch and lactic acid, the herein described improvement which comprises drying in vacuo, a mixture consisting essentially of lactic acid, starch and water, such starch being heated with water during the making of such preparation to a cooking temperature, the amount of such water being sufficient to gelatinize the starch, and the ratio of lactic acid to starch in the said mixture being not substantially below 2:3.
9. A process which comprises gelatinizing starch in aqueous liquid, mixing lactic acid with the same, and drying, the ratio of lactic acid to starch in the dried product being not substantially below 2:3.
10. A substantially anhydrous product comprising lactic acid occluded in dried gelatinized starch, the ratio of lactic acid to starch being not substantially below 2:3.
11. A baking powder in which the acid reacting substance comprises the solid form of lactic acid covered in claim 6.
12. Lactic acid dried into gelatinized starch, the amount of such lactic acid being equal to a major fraction of the amount of such starch.
13. A process which comprises forming an intimate mixture of gelatinized starch, lactic acid and water, in which the amount of actual lactic acid is at least a major fraction of the amount of actual starch, and drying such mixture by heating under pressure substantially below normal atmospheric, until the same is substantially anhydrous.

14. A process which comprises drying at reduced atmospheric pressure, a mixture consisting largely of gelatinized starch and lactic acid, and heating the material at temperatures higher than 125° C., but not high enough to greatly injure the product.

15. A process which comprises heat-treating a gelatinized starch paste containing lactic acid at temperatures sufficiently high to produce a yellowish brown product.

16. In the preparation of solid preparations containing lactic acid in a starchy material, the herein described steps of mixing a gelatinized starchy material containing some dextrin, with lactic acid and drying the product while under a pressure substantially below atmospheric during a substantial portion of the entire drying operation.

17. In the preparation of solid preparations containing lactic acid in a starchy material, the herein described steps of mixing a gelatinized starchy material with lactic acid and drying the product under pressure substantially below atmospheric and converting some of the starch into dextrin, at any time before the end of the drying step.

18. Dry vitreous partially dextrinized gelatinized starch carrying an occluded lactic acid, such product being sufficiently stable for use as the acid constituent of a baking powder.

19. Dry vitreous partially dextrinized gelatinized starch carrying lactic acid.

20. A baking powder containing dry partly dextrinized gelatinized starch carrying occluded lactic acid.

21. In the preparation of a dry form of lactic acid suitable for use in edible products, the step of drying a pasty preparation containing starchy material in a gelatinized state and lactic acid, while spread out into the form of a thin sheet.

22. In the preparation of an acid-containing material suitable as the acid constituent of a baking powder, the herein described step of drying a mixture of a gelatinized starchy material and lactic acid, and converting a portion of the starch while in said mixture, into dextrin.

23. In the preparation of an acid-containing material suitable as the acid constituent of a baking powder, the herein described step of drying a mixture of a gelatinized starchy material and lactic acid, such drying operation being conducted while the material is spread out into a thin sheet kept in motion and while in that condition subjected to pressure substantially below atmospheric and to heat, the material being heated during the drying process to a temperature sufficient to somewhat darken the product.

24. A process of preparing the acid ingredient of an edible product which comprises mixing lactic acid with gelatinized starch containing an insufficient amount of water to cause spattering during heat-drying in a vacuum drier, thereafter drying the product while under pressure substantially below atmospheric but without volatilizing or decomposing any large proportion of the lactic acid, and carrying the heating to a degree sufficient to give the dried product a yellowish color, the proportions employed being such as to give a dry product containing substantially over 30% of lactic acid.

25. As a new product suitable for use as the acid constituent of baking powder, dry gelatinized starch carrying at least 30% of lactic acid, said starch being partly dextrinized as shown by having a yellowish color.

26. A baking powder containing a carbonate salt and lactic acid occluded in a gelatinized starchy material, the lactic acid and starchy material together constituting a dry product, and which baking powder is capable when fresh of liberating not below 13% of carbon dioxide from the reaction between said lactic acid and said carbonate salt, upon being treated with water.

In testimony whereof we affix our signatures.

ELMER V. McCOLLUM.
OLAF S. RASK.